United States Patent [19]
de Gier et al.

[11] Patent Number: 5,533,682
[45] Date of Patent: Jul. 9, 1996

[54] DEVICE FOR CRUSHING AND/OR CUTTING MATERIAL

[75] Inventors: Gertrudis M. G. de Gier, Velddriel; Adrianus M. C. M. van Doornmalen, Ammerzoden; Hendrikus T. J. J. Wingens, Schayk, all of Netherlands

[73] Assignee: Methold 's-Hertogenbosch B.V., 's-Hertogenbosch, Netherlands

[21] Appl. No.: 299,178

[22] Filed: Aug. 31, 1994

[30] Foreign Application Priority Data

Sep. 2, 1993 [NL] Netherlands ............... 9301517
Apr. 20, 1994 [EP] European Pat. Off. ....... 94201084

[51] Int. Cl.⁶ ............................. B02C 1/06; B02C 21/02
[52] U.S. Cl. ........................ 241/101.73; 241/266; 30/228
[58] Field of Search ................... 30/134, 228, 231, 30/258; 144/34 E; 241/101.73, 264, 266; 294/104; 414/740

[56] References Cited

U.S. PATENT DOCUMENTS

| | | | |
|---|---|---|---|
| 4,217,000 | 8/1980 | Watanabe | 241/101.7 X |
| 4,686,767 | 8/1987 | Ramun et al. | 30/134 |
| 4,961,543 | 10/1990 | Sakato et al. | 241/101.7 X |
| 5,146,683 | 9/1992 | Morikawa | 30/134 |
| 5,187,868 | 2/1993 | Hall | 30/134 |

FOREIGN PATENT DOCUMENTS

| | | |
|---|---|---|
| 0435702 | 7/1991 | European Pat. Off. . |
| 0453773 | 10/1991 | European Pat. Off. . |
| 3346235A1 | 7/1984 | Germany . |

*Primary Examiner*—Timothy V. Eley
*Attorney, Agent, or Firm*—Skjerven, Morrill, MacPherson, Franklin & Friel; Thomas S. MacDonald

[57] ABSTRACT

The invention relates to a device for crushing and/or cutting material, which is provided with a frame having coupling means by which said frame can be coupled to the jib of an excavator or the like. A first jaw occupying a fixed position with respect to the frame during operation is connected to the frame, as is a second jaw cooperating with said first jaw. The second jaw is pivotable about a pivot pin with respect to the frame by means of a setting cylinder in a direction towards the first jaw and in a direction away from the first jaw. The first jaw is detachably connected to the frame by means of said pivot pin and a second pin located at some distance from said pivot pin, and the second jaw is detachably connected to the frame by means of said pivot pin and a pin coupling the second jaw to the setting cylinder.

20 Claims, 10 Drawing Sheets

DEVICE FOR CRUSHING AND/OR CUTTING MATERIAL

FIELD OF THE INVENTION

The invention relates to a device for crushing and/or cutting material, said device being provided with a frame having coupling means by which said frame can be coupled to the jib of an excavator or the like, whilst a first jaw occupying a fixed position with respect to the frame during operation is connected to the frame, as is a second jaw cooperating with said first jaw, said second jaw being pivotable about a pivot pin with respect to the frame by means of a setting cylinder in a direction towards the first jaw and in a direction away from the first jaw.

BACKGROUND OF THE INVENTION

Such a device is known from U.S. Pat. No. 4,961,543. In this known device the first jaw is integral with the frame. A device like that is for example suitable for crushing concrete, but less so or not at all for crushing or cutting other materials, for example for cutting scrap iron and/or iron sections, for cutting and splitting wood, etc. Consequently different devices of this kind are being used in practice for crushing or cutting different materials. For a demolition company or the like this involves considerable investments.

SUMMARY OF THE INVENTION

According to the invention the first jaw is detachably connected to the frame by means of said pivot pin and a second pin located at some distance from said pivot pin, and the second jaw is detachably connected to the frame by means of said pivot pin and a pin coupling the second jaw to the setting cylinder.

By using a construction of this kind it is possible to exchange the jaws coupled to the frame, which are very well suited for carrying out a particular activity, for jaws which are very well suited for a different activity. Thus this device can be optimally adapted for carrying out different activities, such as for example crushing concrete, cutting iron sections and/or scrap iron, cutting and splitting wood etc., by exchanging the jaws whilst using one and the same device.

Whilst using one and the same device it is thus only necessary to purchase a number of different pairs of jaws for carrying out different activities, which will involve a considerable saving in comparison with purchasing a number of complete, mutually different devices, which was usual up to now.

BRIEF DESCRIPTION OF THE DRAWINGS

The invention will be explained in more detail hereafter with reference to the accompanying Figures.

2

FIG. 17 is a side view of two jaws in particular intended for cutting and splitting wood, logs, root ends and the like.

DETAILED DESCRIPTION

Figures 1, 2:
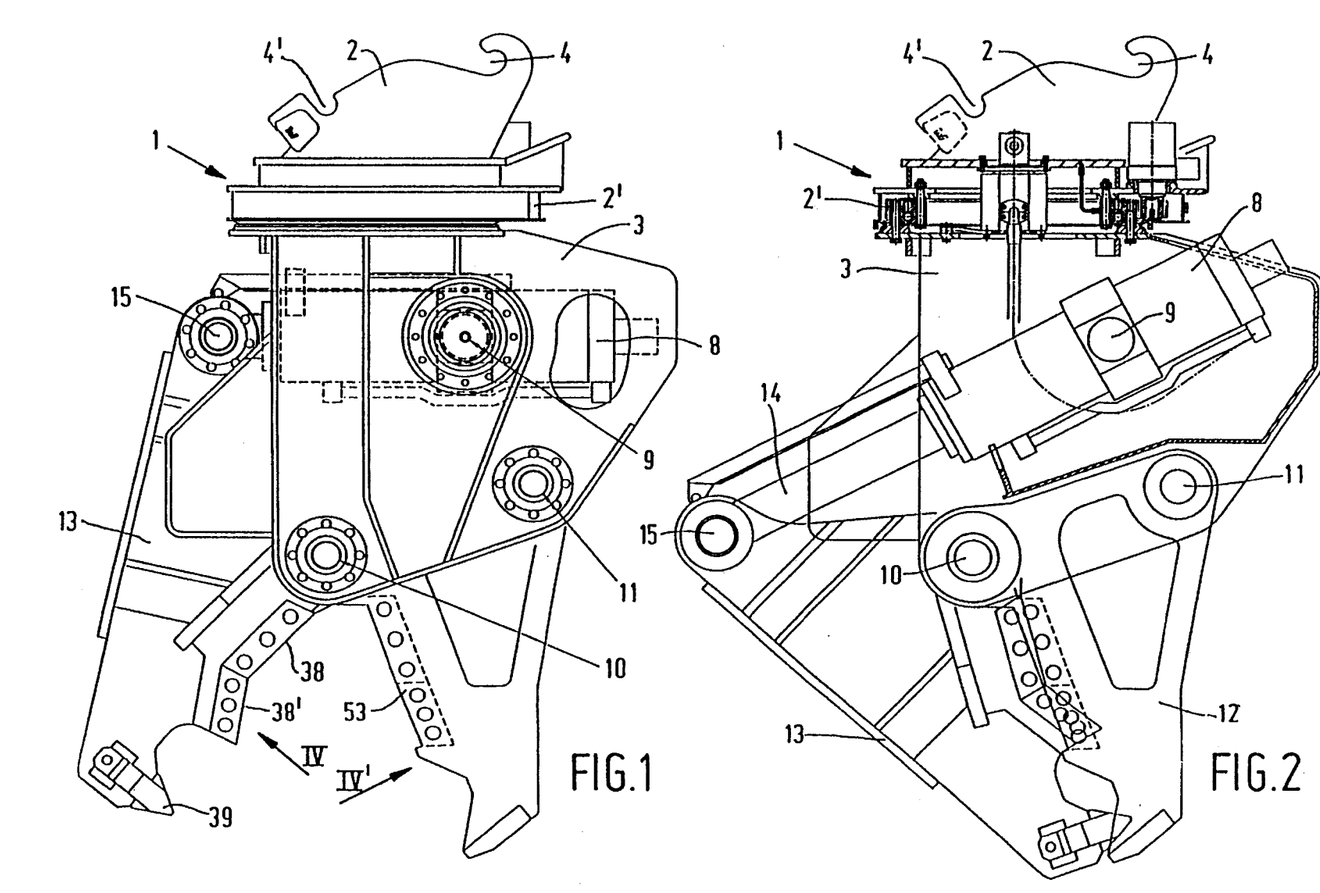
FIG. 1 is a diagrammatic side view of the device according to the invention, with the jaws in their open position.
FIG. 2 shows the device illustrated in FIG. 1, partly in side elevation and partly in section, with the jaws in their closed position.
Figure 3:
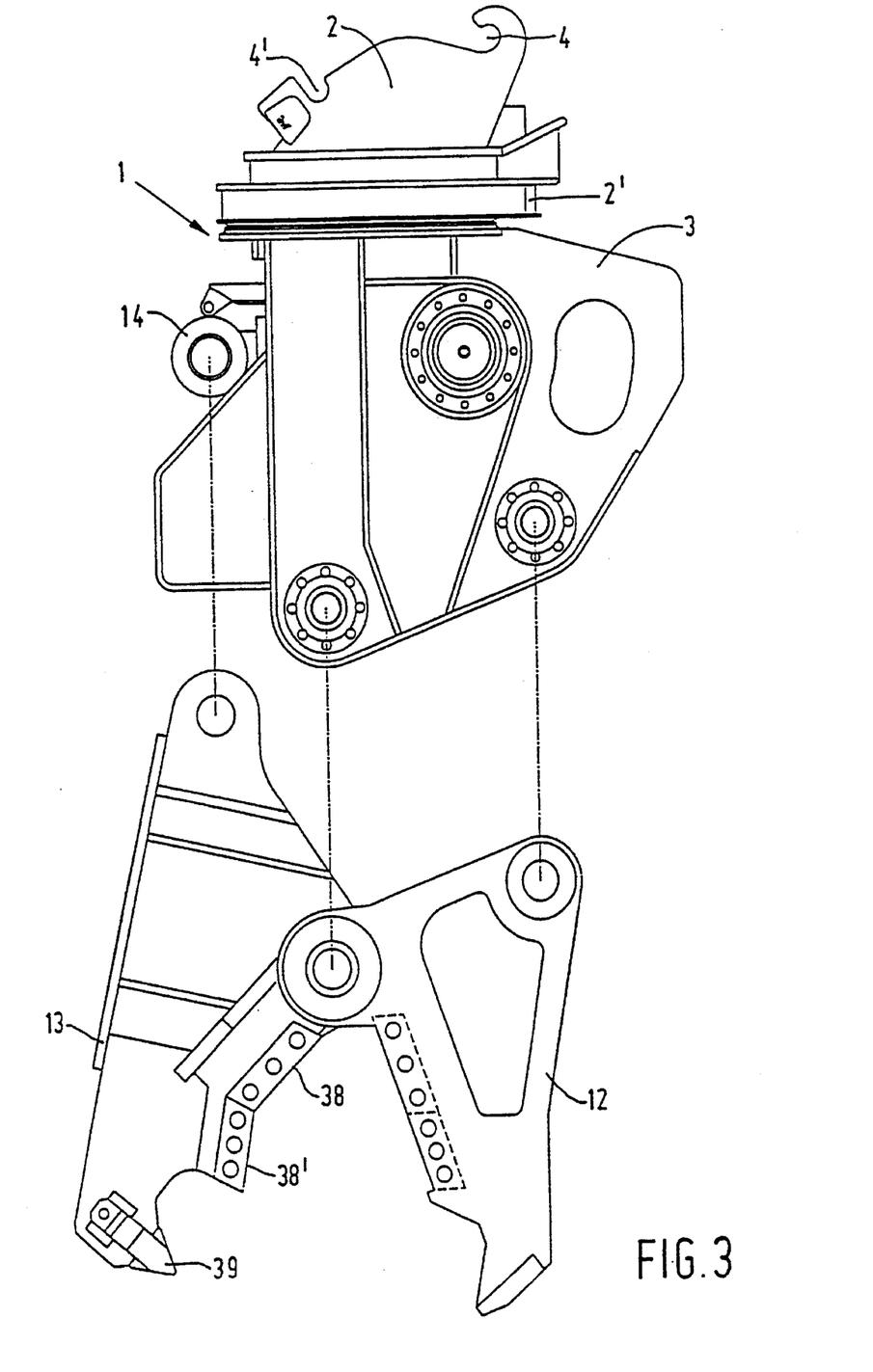
FIG. 3 is a side view of the device shown in FIGS. 1 and 2, showing the jaws spaced from the frame of the device.
Figure 4:
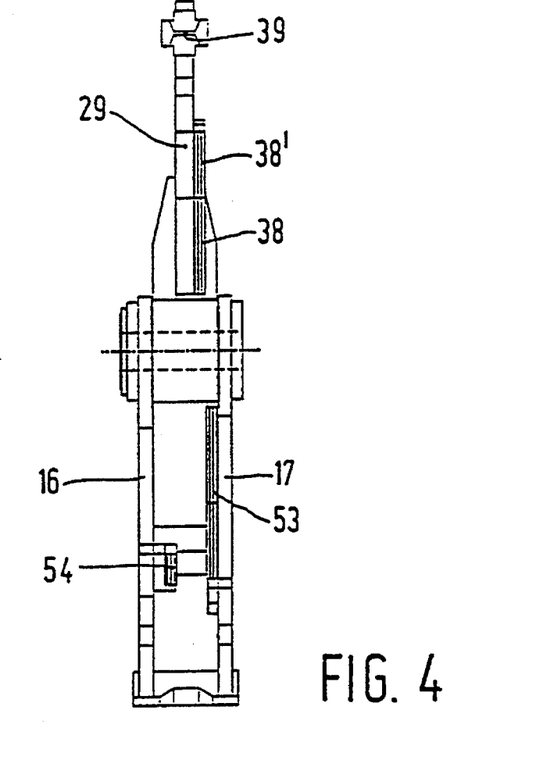
FIG. 4 is an elevational view of the jaws, seen in the direction according to the arrows IV and IV' respectively in FIG. 1.

The device shown in FIGS. 1–3 comprises a frame 1 comprising a first frame part 2, which frame part 2 is coupled to a second frame part 3 by means of a turn table 2', in such a manner that the two frame parts 2 and 3 are rotatable with respect to each other by means (not shown), for example hydraulically operated setting means which are known per se, whereby a rotary valve for the supply and discharge of fluid for a setting cylinder is provided.

Figure 5:
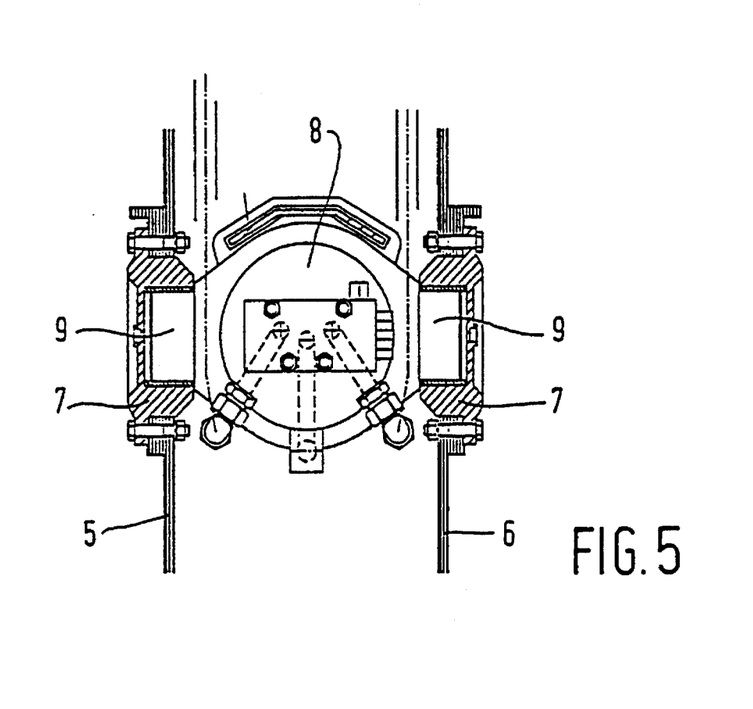
FIG. 5 shows a detail of the suspension of the setting cylinder within the frame.

The frame part 2 is provided with coupling means 4, 4' which are known per se, by which the device can be coupled to for example the end of an excavator arm. As is shown in more detail in FIG. 5 the frame part 3 comprises spaced-apart plates 5 and 6 extending parallel to each other. Aligned holes, in which bearings 7 are mounted, are provided in said plates. Journals 9, which are fixedly connected to a setting cylinder 8, are located within said bearings, in such a manner that the setting cylinder 8 is pivotally supported in the frame 1 by means of said journals 9.

Figure 6:
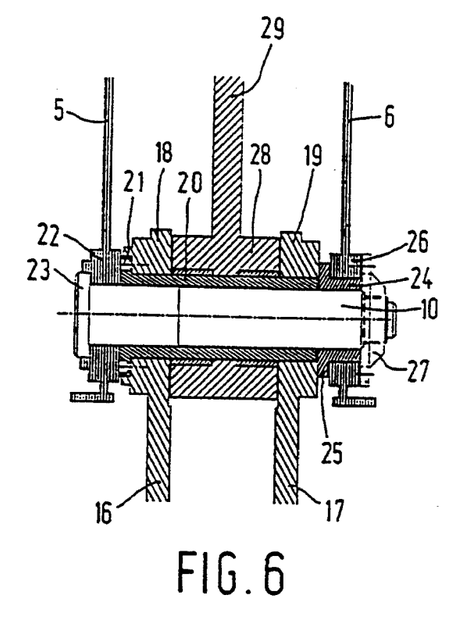
FIG. 6 is a sectional view of the jaws at the location of the pivot pin, by means of which the two jaws are connected to the frame of the device.

The plates 5 and 6 furthermore support a pivot pin 10 (FIG. 6). A first jaw 12 is fixed to the frame part 3 of the frame 1 by means of said pivot pin 10 and a pin 11 being spaced from said pivot pin 10 and extending parallel thereto. Furthermore a second movable jaw 13 is pivotable about the pivot pin 10 by means of the setting cylinder 8, for which purpose the end of a piston rod 14 of the setting cylinder 8 is coupled to one end of the pivotal jaw 13 by means of a pin 15 extending parallel to the pivot pin 10.

As is shown in more detail in FIG. 6 the first or fixed jaw 12 comprises two spaced-apart, parallel plate-shaped parts 16 and 17, which are provided with hubs 18 and 19 respectively, in which a bush 20 is accommodated. The bush 20 is at one side provided with an outwardly extending collar 21, which is fixed to the hub 18 by means of bolts (not shown). A hub 22 fixed to the plate 5 and surrounding the pin 10 abuts against the end of the collar 21 remote from the hub 18 and projecting beyond said hub. A head 23 secured to the pin 10 abuts against the outer side of the hub 22. The length of the bush 20 is designed such that the end of the bush 20 remote from the collar 21 does not project beyond the hub 19, but is spaced by some distance from the end face of the hub 19 remote from the collar 21.

A bush 24 is provided on the end of the pin 10 projecting beyond the hub 19, said bush being provided with a circumferential collar 25 projecting radially outwards, which abuts against the end face of the hub 19. The bush 24 is surrounded by a hub 26 being integral with the plate 6 of the frame part 3. When seen in the longitudinal direction of the pin 10 the width of the hub 26 is smaller than the length of the part of the bush 24 surrounded by the hub.

A nut 27, which is screwed on the reduced threaded end of the pin 10, abuts against the end face of the bush 24 remote from the collar 25.

A hub 28 forming part of the movable jaw 13 and being secured to a plate 29 forming part of the movable jaw is pivoted about the part of the bush 20 between the hubs 18 and 19. It will be apparent that by tightening the nut 27 the two hubs 18 and 19 of the fixed jaw will be moved towards each other and be pressed against the sides of the hub 28 of the movable jaw 13, so that the two jaws 12 and 13 can be retained on the pin 10 without play.

In order to ensure that the pin 10 can be readily mounted within the bush 20 or be removed therefrom the design of the outer circumference of the pin 10 and the inner circumference of the bush 20 is such that the outer circumference of the pin 10 is only in direct contact with the inner circumference of the bush 20 along part of the length of said bush 20 near the ends of the bush 20, whereby of course the diameter of the part of the pin 10 located near the head 23 of the pin 10 is slightly larger than the other part of the pin 10.

Figure 7:
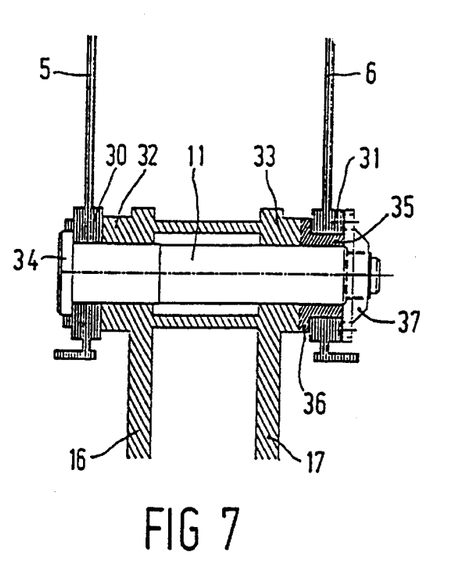
FIG. 7 is a sectional view of the jaws at the location of the further pin by means of which the first jaw is connected to the frame.

As is furthermore shown in FIG. 7 the plates 5 and 6 of the frame part 3 are provided with further hubs 30 and 31 for accommodating the pin 11. The pin 11 furthermore extends into the hubs 32 and 33 connected to the plates 16 and 17 of the fixed jaw 12.

At one end the pin 11 has a head 34 integral with the pin, which head abuts against the outer side of the hub 30 forming part of the frame part 3. The part of the pin 11 joining the head 34 is accommodated with a close fit in the hubs 30 and 32. The part of the pin 11 joining said part is slightly reduced with respect to the part of the pin 11 located within the hubs 30 and 32.

The reduced part of the pin 11 is accommodated with a close fit within the hub 33, whilst the end of the pin projecting beyond the hub 33 is surrounded by a bush 35, which is provided with a circumferential collar 36 abutting against the outer side of the hub 33. The bush 35 is accommodated with a close fit within the hub 31 connected to the plate 6 of the frame part 3. A nut 37 is screwed on the threaded free end of the pin 11. The construction is thereby such that upon tightening of the nut 37 the collar 36 of the bush 35 is pressed against the outer side of the hub 33 and the hub 30 is pulled against the outer side of the hub 32 via the head 34, so as to mount the fixed jaw 12 on the pin 11 without play.

As is shown in more detail in FIGS. 1–3 the pivotable jaw 13 comprises two adjoining knives 38 and 38', whose cutting edges include an obtuse angle with each other. A crusher tooth 39 is provided near the free end of the jaw 13.

Figures 9, 10:
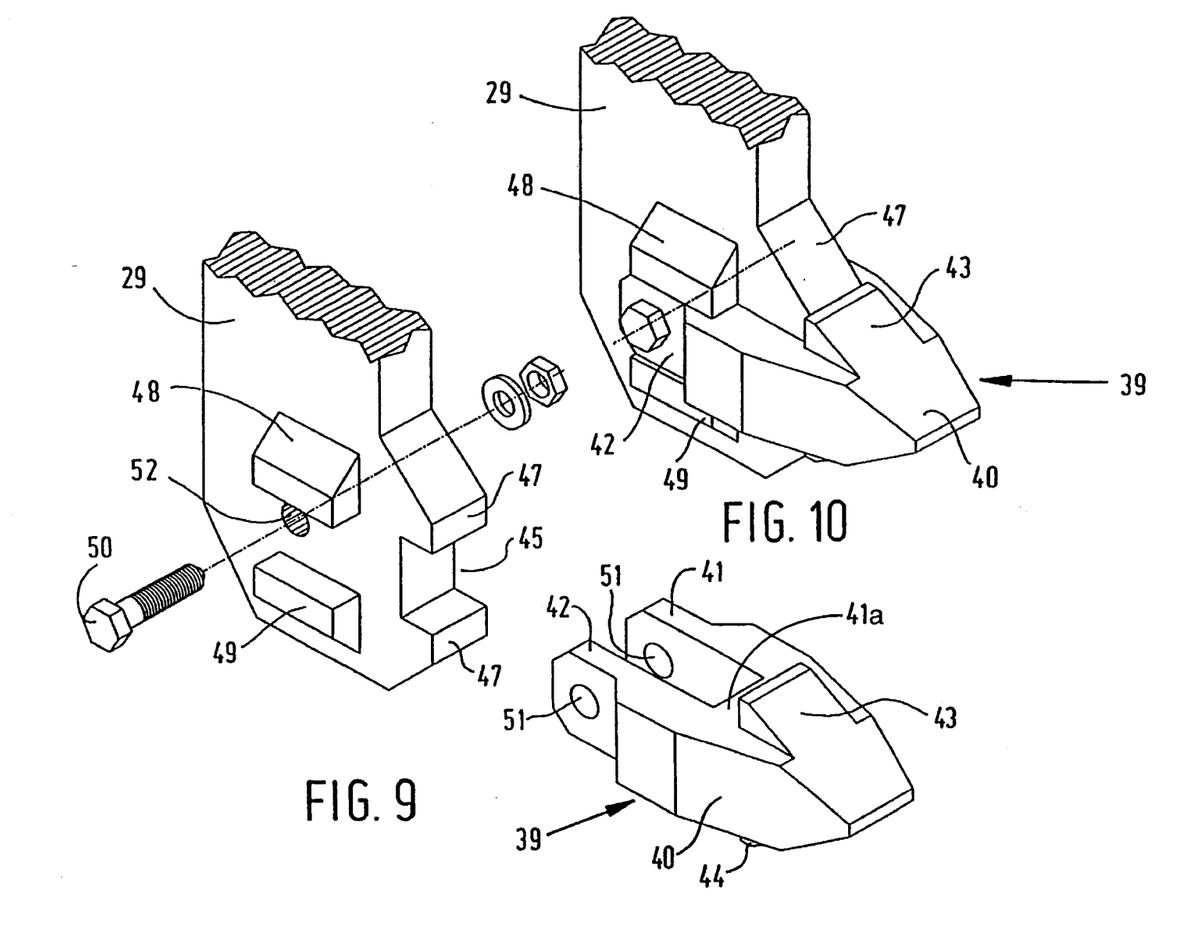
FIG. 9 is a perspective view, showing the parts in spaced-apart relationship and a part of a jaw and a tooth mounted on said jaw.
FIG. 10 is a perspective view of the tooth fixed to the jaw.

As is illustrated more particularly in FIGS. 9 and 10 the crusher tooth has a body 40 more or less in the shape of a truncated pyramid blending into two wings 41 and 42 extending parallel to each other. Said body 40 in the shape of a truncated pyramid is provided with projecting cams 43 and 44 on two opposite sides.

Near the free end of the plate 29 of the pivotable jaw 13 a recess 45 is provided, which is bounded by two noses 47, one lying above the other. The construction is thereby such that the free end of the plate 29 can be accommodated between the wings 41 and 42 with a close fit, whereby the projecting noses 47 will closely abut against surfaces 41a of the body 40 and the cams 43 and 44 will abut against the ends of the noses 47.

The ends of the wings 41 and 42 are retained between cams 48 and 49 secured to the sides of the plate 29.

Finally the crusher tooth 39 is fixed to the plate 29 by means of a bolt 50, which is passed through holes 51 provided in the wings 41 and 42 and through a hole 52 provided in the plate 29.

As a result of the above-described manner of retaining the tooth 39 by means of the various cooperating cams and noses, no shearing force or the like will be exerted on the bolt during operation, so that undesirable deformations of and damage to the bolt will be avoided, as a result of which the bolt will be readily removable at all times. At the same time the bolt head and the nut are protected by the thickened parts of the wings 41 and 42 located in front thereof. Accordingly also the tooth 39 will be readily removable so as to be exchanged in case of wear. Furthermore it is possible now to use a wear-resistant material for this tooth, which is subjected to high loads during operation, so that an optimum construction of the exchangeable tooth may be obtained, this in contrast to the usual constructions, wherein a tooth is integral with the other part of the jaw.

The fixed jaw is provided with a rectilinear knife 53, which may be built up of several sections, which knife is slightly staggered in a direction perpendicularly to the pivot pin 10 with respect to the knives 38 and 38', in such a manner that when the two jaws 12 and 13 move towards each other the knives 38 and 38' will move along the knife 53 so as to carry out a cutting action.

A short guide knife 54, which is secured to the plate 16 of the fixed jaw 12, is disposed near the free end of the fixed jaw 12, opposite the knife 53, which is secured to the plate 17 of the fixed jaw 12. At the end of the movement of the jaw 13 towards the jaw 12 the end of the knife 38' located furthest from the pivot pin 10 will be accommodated between the two knives 53 and 54, so that a good guiding of the pivotable jaw 13 with respect to the fixed jaw 12 is obtained, in order to prevent the two jaws 12 and 13 from moving out transversely to the longitudinal direction of the knives with respect to each other.

The above-described jaws 12 and 13 are particularly suitable both for crushing concrete and for cutting iron sections. As a result of the construction described a large opening between the two jaws may be obtained thereby when the movable jaw 15 is opened with respect to the fixed jaw 12, whilst upon closing of the jaws the material is prevented from completely moving towards the free ends of the jaws, which has the further advantage that the force required for moving the jaws towards each other when the profiles are being cut may be kept comparatively low.

As likewise mentioned the guide knife 54 provides a good guiding of the two jaws with respect to each other upon closing of the jaws.

In addition the crusher tooth 39 may be used during operation for crushing the concrete shell or the like which may surround the sections to be cut.

Figure 8:
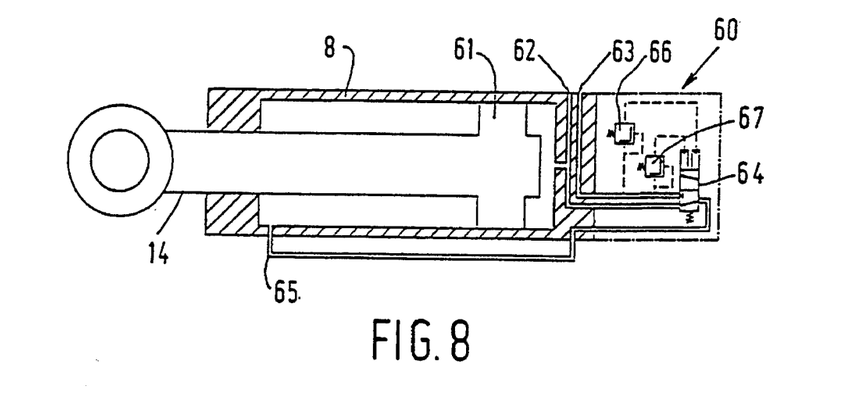
FIG. 8 is a diagrammatic view of a valve mechanism and the setting cylinder.

As is shown in more detail in FIG. 8 a valve mechanism 60 is secured to one end of the setting cylinder 8.

Pipes 62 and 63 are provided for the supply and discharge of oil to both sides of the piston 61 secured to the piston rod 14. The pipe 62 is in open communication with the interior of the cylinder 8 at the side of the piston 61 remote from the piston rod 14. Furthermore both the pipe 62 and the pipe 63 are connected to a valve 64 forming part of the valve mechanism 60, which valve is adjustable in two positions. In the position of said valve illustrated in the Figure the pipe 62 is in open communication with a pipe 65 via said valve, said pipe 65 being in communication with the interior of the cylinder 8 at the rod side of the piston 61.

In a second position of the valve 64 the connection between the pipe 62 and the pipe 65 will be closed and an open communication will have been effected between the pipe 63 and the pipe 65.

When the pivotable jaw 12 moves towards the fixed jaw 13, oil will be supplied, via the pipe 62, to the cylinder 8 at the side of the piston 61 remote from the piston rod 14, as a result of which the piston rod 14 will be moved towards the left in FIG. 8. As long as the jaw meets with little resistance thereby the arrangement will be as shown in FIG. 8, which will not only result in oil being supplied to the cylinder 8 via the line 62, but also in oil squeezed out of the cylinder 8 to the left of the piston 61 in FIG. 8 flowing into the cylinder space located to the right of the piston through the pipe 65 and the valve 64, as a result of which a quick outward movement of the piston rod 14 and thus a quick pivoting of the pivotable jaw 13 towards the fixed jaw 12 is obtained.

When the pivotable jaw 13 meets with more resistance the pressure within the pipe 62 will run up and pressurized fluid will be supplied to the valve 64, via a control valve 66, in order to set the valve 64 from the position shown in FIG. 8 to the second position, in which the fluid flowing out of the cylinder 8 via the pipe 65 is discharged via the pipe 63. At this stage the movement of the piston rod 14 and thus the pivoting of the pivotable jaw 13 only takes place by means of fluid supplied through the pipe 62. Consequently this pivoting of the jaw will take place more slowly but with greater force.

When the pivotable jaw 13 is to be pivoted in a direction remote from the fixed jaw 12, pressurized fluid will be supplied through the pipe 63. Via a further control valve 67 pressurized oil is also supplied to the valve 64 thereby, in order to retain said valve in the aforesaid second position, in which the pipe 63 is in open communication with the pipe 65. The oil present in the cylinder 8 to the right of the piston 61, seen in FIG. 8, may be discharged through the pipe 62 thereby.

Since the valve mechanism 60 is mounted directly on one end of the cylinder 8, a compact construction is obtained and the amount of heat generated in the hydraulic system is kept to a minimum.

From the above description it will be apparent that the two jaws 12 and 13 can be readily disconnected from the frame 1 by removing the pins 10, 11 and 15. The disconnected jaws will remain pivotally coupled together thereby, by means of the bushing 20, which is fixedly connected to the fixed jaw 12. As a result of this it becomes possible to exchange the jaws 12 and 13 in a quick and simple manner for other pairs of jaws, which are more particularly suited for other activities, for example for breaking concrete, cutting and splitting wood and the like.

Figures 11, 12:
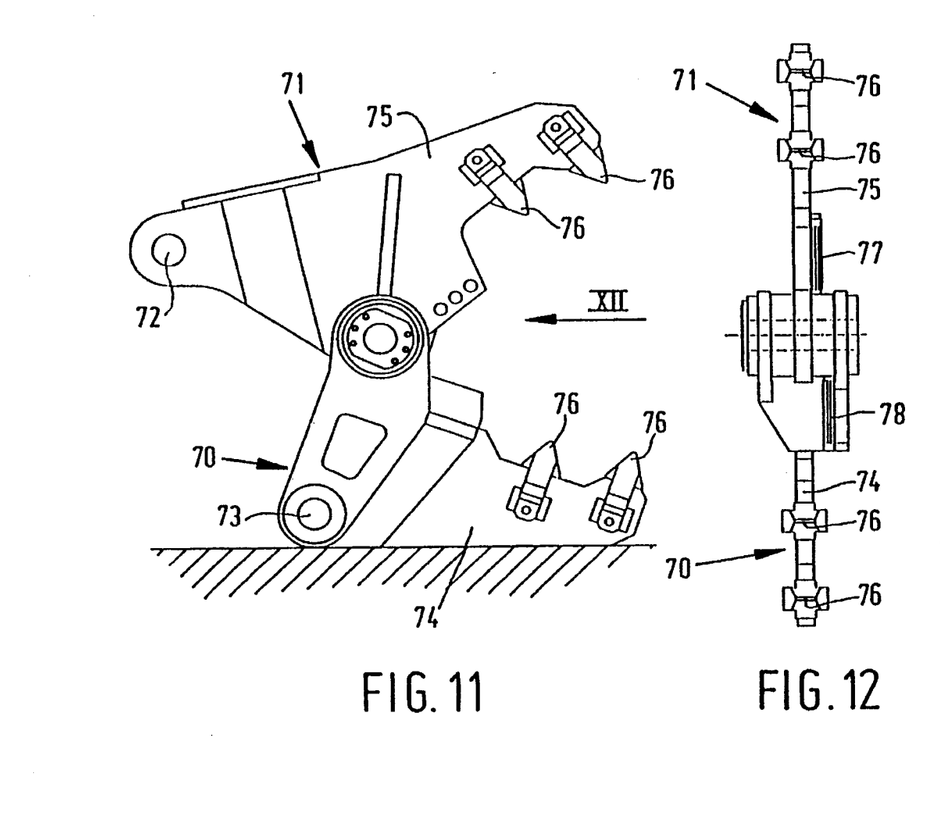
FIG. 11 is a side view of two jaws in particular intended for being used in crushing concrete.
FIG. 12 is an elevational view of FIG. 11, seen according to the arrow XII, with the jaws pivoted further apart.
Figure 13:
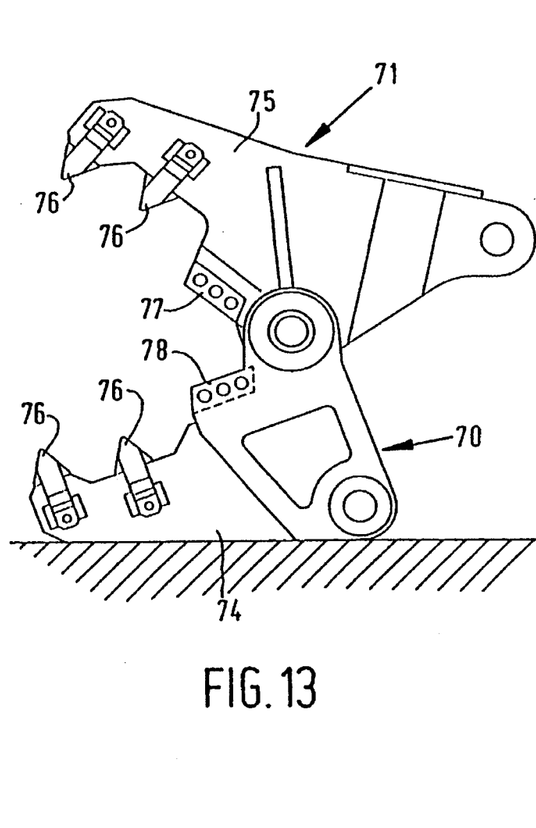
FIG. 13 shows the jaws depicted in FIG. 11, seen from the other side.

Thus the jaws 12 and 13 may be exchanged for the jaws 70 and 71 illustrated in FIGS. 11–13, which are pivotally coupled together in a similar manner as described above. Near one end the pivotable jaw 71 is thereby provided with a hole 72 for passing the pin 15, by means of which the jaw 71 in question may be coupled to the piston rod 14 of the setting cylinder 8, whilst the fixed jaw 70 is provided with a passage 73 for passing the pin 11 by means of which the jaw may be fixed to the frame part 3.

As is furthermore apparent from FIGS. 11–13 the two jaws 70 and 71 in this embodiment are provided with plate-shaped bodies 74 and 75 respectively, to which crusher teeth 76 corresponding with the above-described crusher tooth 39 are secured in a manner similar to that described with regard to the crusher tooth 39. The construction is thereby such that when the jaws move towards each other the crusher teeth 76 come into contact with each other.

This combination of jaws illustrated in FIGS. 11–13 is in particular intended for crushing concrete, such as for example concrete floors and foundations, as well as walls of buildings and the like.

Near the pivot pin about which the two jaws pivot with respect to each other short intermating knives 77 and 78 are furthermore provided, by means of which reinforcing steel, which may become exposed when reinforced concrete is being crushed, can be cut through.

Figure 14:
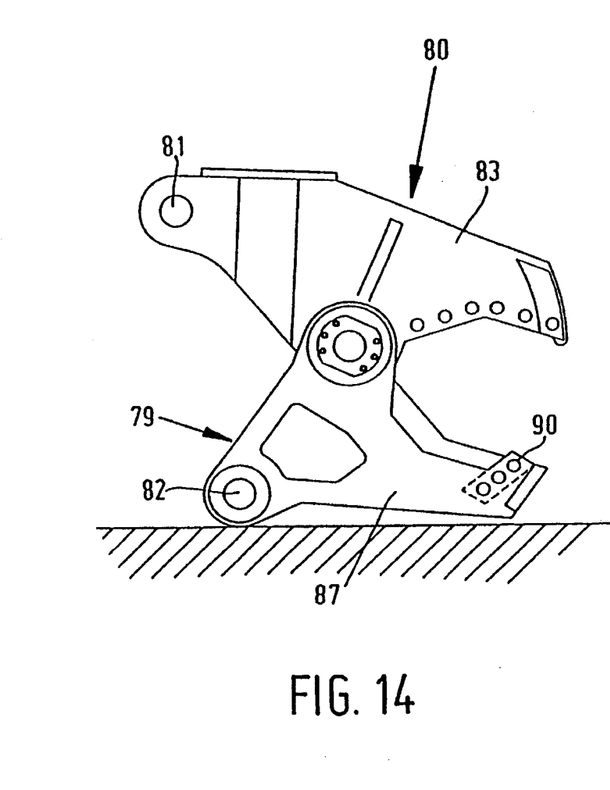
FIG. 14 is a side view of two jaws in particular intended for cutting scrap iron and/or iron sections.
Figure 15:
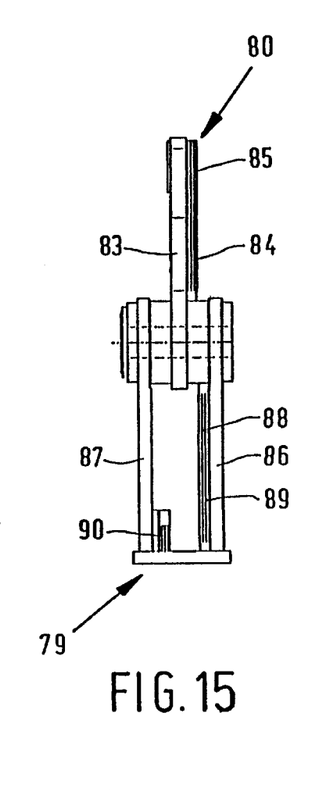
FIG. 15 is an elevational view of FIG. 14, with the jaws pivoted further apart.
Figure 16:
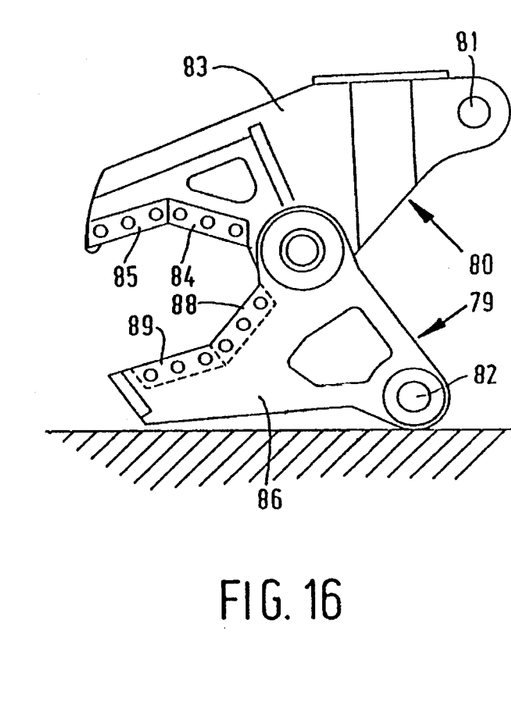
FIG. 16 is an elevational view from the other side of the jaws illustrated in FIG. 14.

FIGS. 14–16 show a further embodiment of two cooperating jaws 79 and 80, wherein the jaw 79 is the fixed jaw to be connected to the frame 1 and the jaw 80 is the pivotable jaw. Also in this embodiment said jaws are pivotally coupled together, in a similar manner as described above with reference to for example the jaws 12 and 13, by means of a bush in which the pivot pin 10 may be accommodated. Furthermore the jaw 80 is provided with a hole 81, through which the pin 15 may be passed, whilst the jaw 79 is provided with a passage 82 for accommodating the pin 11.

As is furthermore apparent from FIGS. 14–16 the movable jaw 80 is provided with a plate-shaped body 83, to which two knives 84 and 85 are secured, whose cutting edges include an obtuse angle with each other.

The fixed jaw 79 is provided with two plate parts 86 and 87 extending parallel to each other. Two knives 88 and 89, whose cutting edges include an obtuse angle with each other, are secured to the plate part 86. Furthermore a short knife 90 is secured to the free end of the plate part 87.

Said jaws are in particular configured so as to form a cutting device for cutting scrap iron and iron sections. At the end of the closing movement the knife 85 will be accommodated between the knife 89 and the knife 90, as a result of which a good guiding of the two jaws with respect to each other will be obtained upon closing. As a result of the above-described arrangement of the knives 84, 85 and 88, 89 the material to be cut is furthermore prevented from moving out of the jaw upon closing.

Figure 17:
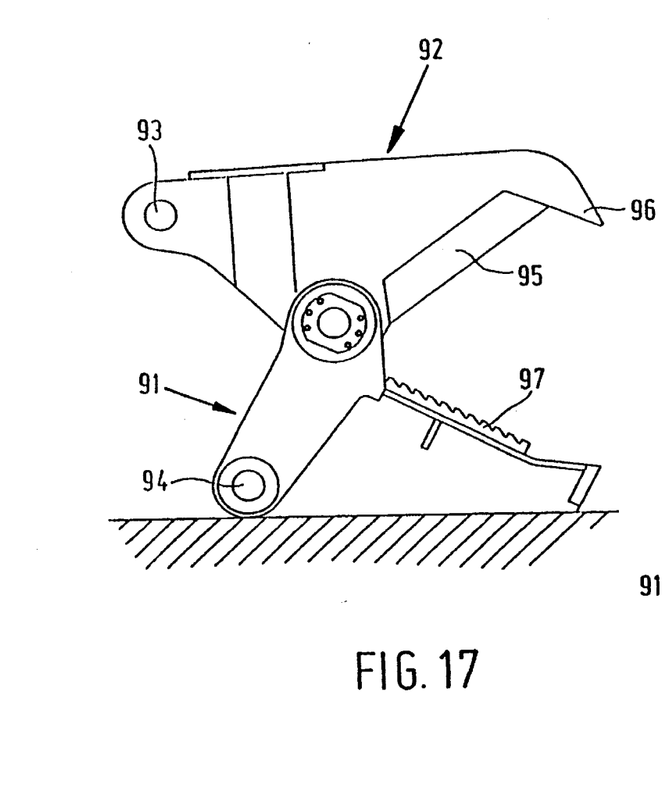
Figures 18, 19:
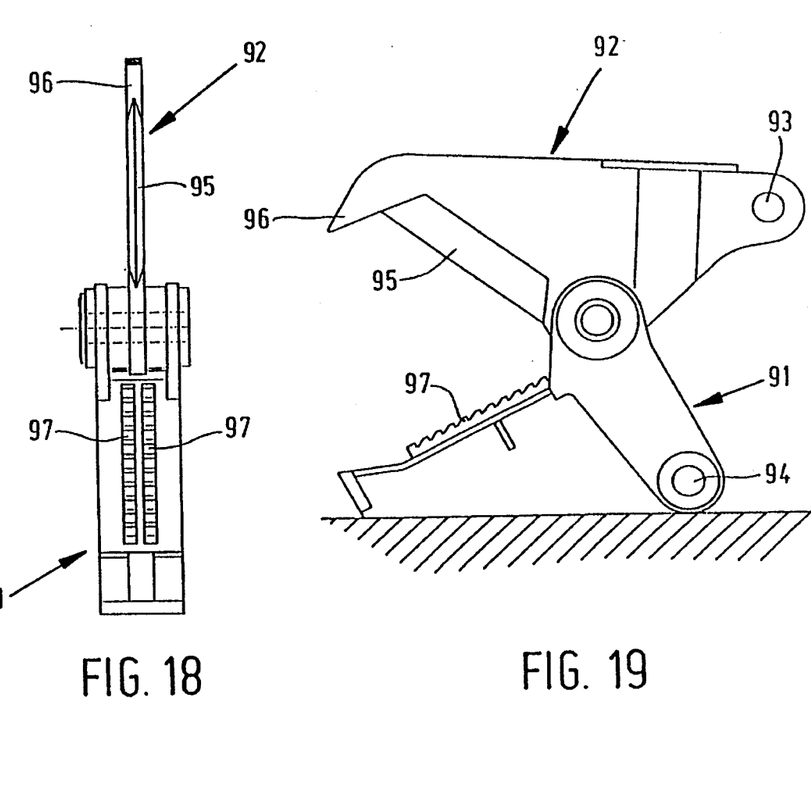
FIG. 18 is a side view of FIG. 17, with the jaws pivoted further apart.
FIG. 19 is a side view of the jaws shown in FIG. 17, seen from the other side.

FIGS. 17–19 show two jaws 91 and 92, which may be coupled to the frame 1 instead of the jaws 12 and 13, in order to form a wood cutting device, which is in particular suited for cutting and splitting wood, logs, root ends and the like. Also in this embodiment the jaw 92 will be the movable jaw and the jaw 91 will be the fixed jaw. For this purpose the jaw 92 is provided with a hole 93 for passing through the pin 15, by means of which the movable jaw 92 may be coupled to the piston rod 14 of the setting cylinder 8. The fixed jaw 91 is provided with a passage 94 for passing through the pin 11, by means of which the fixed jaw 91 is fixedly connected to the frame 1. The movable jaw 92 is provided with a rectilinear knife 95 and furthermore, at its free end, with a projecting tip 96. The fixed jaw is provided with two serrated strips 97, which are sufficiently spaced apart for the knife 95 to engage therebetween.

The serrated profile 97 prevents the material to be cut from moving out of the jaws during cutting.

From the above it will be apparent that the invention provides a device for crushing and/or cutting material, which device is provided with cooperating and readily exchangeable jaws, so that the device can be simply and readily adapted to the specific material to be crushed or cut by means of the device.

Figure 20:
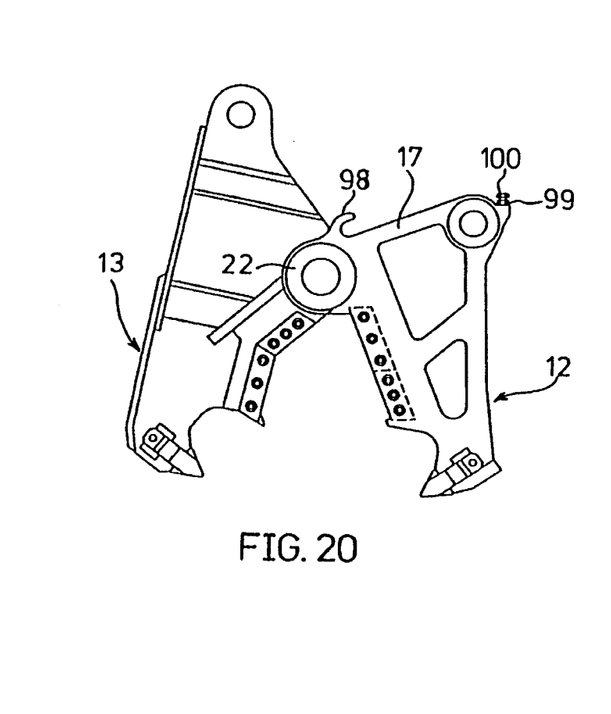
FIG. 20 is a diagrammatic side view of two jaws, wherein one jaw is provided with means for quickly coupling the jaws to a frame.
Figure 21:
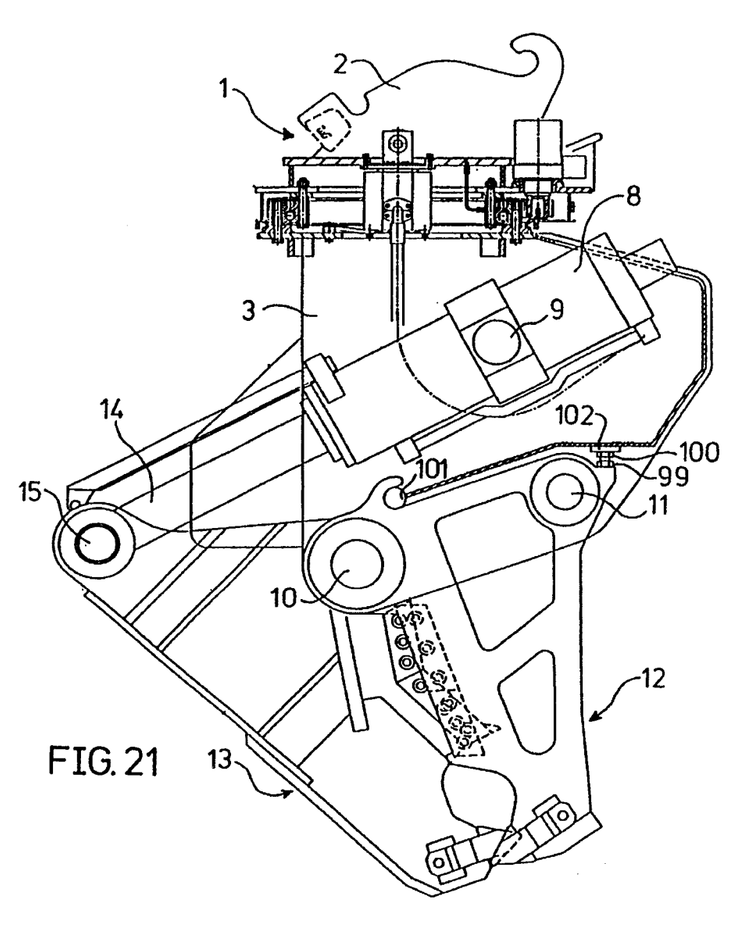
FIG. 21 shows the jaws illustrated in FIG. 20, said jaws being coupled to a frame.

The device shown in FIGS. 20 and 21 at least substantially corresponds with the device shown in FIGS. 1–8 and consequently the parts shown in FIGS. 20 and 21 have been given the same reference numerals as corresponding parts shown in FIGS. 1–8.

In the embodiment shown in FIGS. 20 and 21 hook-shaped coupling means 98 are secured to the plate-shaped parts 16 and 17 (see also FIG. 6) of the fixed jaw 12, near the bush 20 interconnecting the jaws 12 and 13, which coupling means are accessible at a side remote from the pivotable jaw 13 as appears from FIG. 20.

Nuts 99 are furthermore secured to said plate-shaped parts 16 and 17, in points located near the openings for receiving the pin 11, in which nuts set bolts 100 are threaded.

As is furthermore apparent in particular from FIG. 21, a cylindrical rod 101 extending parallel to the journals 9 is furthermore secured between two plates forming part of the frame part 3, and between which the setting cylinder 8 is positioned. When the jaws 12 and 13 are coupled to the frame 3 in the above-described manner, as shown in FIG. 21, the rod 101 is positioned within the hook-shaped parts 98. The heads of the bolts 100 thereby abut against the stop plates 102 secured to the frame 3.

Figure 22:
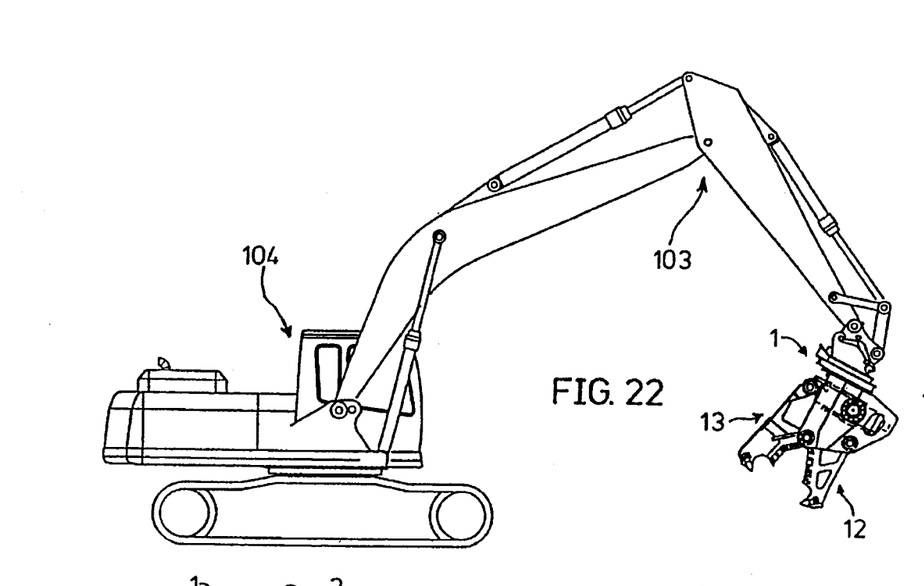
FIG. 22 diagrammatically shows an excavator, whereby the device illustrated in FIG. 21 is coupled to the jib of said excavator.

In order to exchange the jaws of a device suspended in the manner shown in FIG. 22 from the jib 103 of an excavator 104 the pins 10, 11 and 15 may be removed in the position in which the device is suspended from the jib in the manner shown in FIG. 22, preferably after the jaws have been closed. The jaws will remain coupled to the jib 103 thereby, because the jaws will remain supported by the hook-shaped parts 98 engaging behind the rod 101 of the frame part 3.

Figure 23:
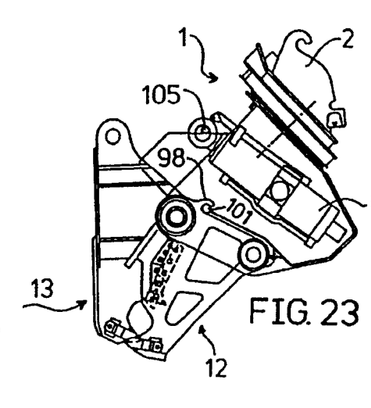
FIG. 23 shows the device illustrated in FIG. 22 without the excavator, in a position in which the device is ready for being uncoupled.
Figure 24A:
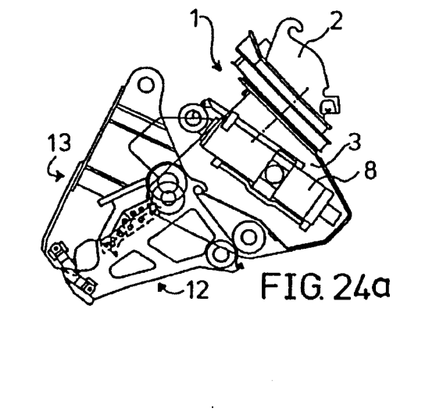
FIG. 24 shows various successive stages during the uncoupling of the device.
Figure 24B:
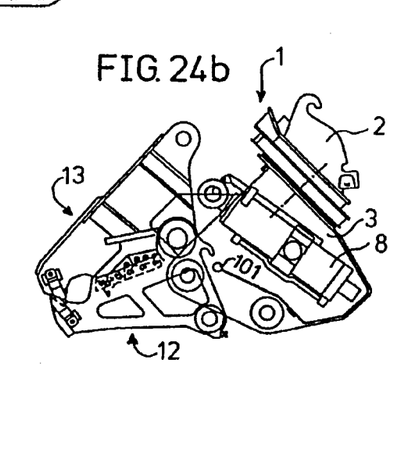
Figure 24C:
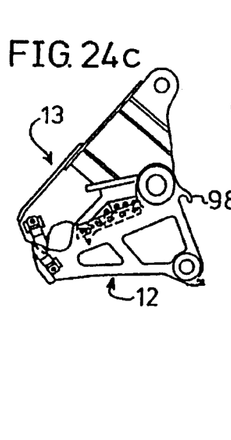
Figure 24D:
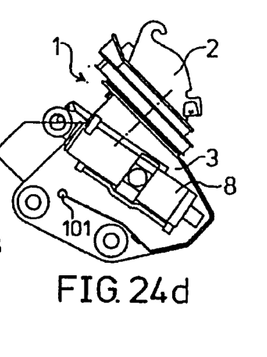

After the pin 15 has been removed, a rod 105 may be pulled through the eye of the piston rod 14, as illustrated in FIG. 23, and it is possible to have said rod 105 supported by a part of the frame 3, in the manner shown in FIG. 23, by withdrawing the piston rod 14, so that undesirable pivoting of the setting cylinder 8 on the journals 9 is prevented.

In order to uncouple the jaws the free end of the fixed jaw 12 may be supported on the ground by suitably pivoting the jib 103 of the excavator 104, as is illustrated on the left in FIG. 24. Then the frame part 3 may be suitably pivoted by manipulating the jib 103, as is illustrated from the left towards the right in the successive Figures in FIG. 24, whereby first the frame part 3 is pivoted anti-clockwise about the central axis of the rod 101, seen in the Figures, and is furthermore also moved slightly downwards, so that the fixed jaw 12 will come to rest on the ground with its side remote from the movable jaw after which the rod 101 may be completely withdrawn from the hook-shaped parts 98 and the coupled jaws 12 and 13 may be left behind on the ground, as depicted in the right-hand part of FIG. 24.

It will be apparent, that the reverse order will be used for coupling the jaws. First the rod or pin 101 is hooked into the hook-shaped parts 98 again by suitably manipulating the frame part 3 coupled to the end of the jib 103, after which the coupled jaws may be lifted, in such a manner that they will pivot about the pin 101 until the set bolts 100 connected to the fixed jaw 12 will abut against the stop plates 102. In this position the passages provided in the jaws for receiving the pins 10 and 11 will be aligned with the respective passages in the frame part 3, so that a quick and simple insertion of the pins 10 and 11 can be effected after the jaws 12 and 13 have been picked up by the frame part 3. Any deviations in the position of the passage for receiving the pin 11 may be set off by rotating the set bolts 100.

After the pins 10 and 11 have been provided also the eye secured to the end of the piston rod may be moved to a suitable position for inserting the pin 15, by pulling out the piston rod 14.

It will be apparent that thus the exchanging of the jaws can be carried out in a quick and simple manner, since the openings intended for receiving the pins 10 and 11 are automatically aligned when the jaws are being coupled to the frame part 3.

Furthermore it will be apparent that other solutions than the above-described embodiment for coupling the jaws 12 and 13 to the frame part are conceivable. Thus the hook-shaped coupling parts might be secured to the frame 3 and the parts cooperating with said hook-shaped coupling parts might be secured to the fixed jaw 13.

We claim:

1. A device for size reduction of material, said device being provided with a frame having coupling means by which said frame can be coupled to a jib; a first jaw occupying a fixed position with respect to the frame during operation, and connected to the frame; a second jaw connected to the frame and cooperating with said first jaw, said second jaw being pivotable about a first pivot pin with respect to the frame by means of a setting cylinder in a direction towards the first jaw and in a direction away from the first jaw; said first jaw being detachably connected to the frame by means of said first pivot pin and a second pin spaced from said first pivot pin; and wherein the second jaw is detachably connected to the frame by said first pivot pin and a third pin coupling the second jaw to the setting cylinder.

2. A device according to claim 1, characterized in that said first jaw is provided with two hubs, the two hubs housing a bush secured to said first jaw, which is suitable for accommodating said first pivot pin, said second jaw including a hub and wherein the hub of the second jaw surrounds said bush and is located between the two hubs of the first jaw.

3. A device according to claim 2, characterized in that said first jaw comprises two plate-shaped parts including the two hubs, and said second jaw comprises a third plate-shaped part, the hub of the second jaw being secured to the third plate-shaped part and being located between the two hubs of the first jaw.

4. A device according to claim 2, characterized in that said bush is at one end provided with a projecting circumferential collar, which is fixed to one side of one of said two hubs.

5. A device according to claim 2, characterized in that said first pivot pin is supported near its ends by a pair of second hubs, which are secured to frame parts, one of said pair of second hubs accommodating a second bush surrounding the first pivot pin, which can be pressed against one of the two hubs of the first jaw by means of a nut to be screwed on one end of the first pivot pin.

6. A device according to claim 2, characterized in that said first pivot pin has a stepped configuration and a bore accommodating said first pivot pin has a stepped configuration corresponding therewith, the configuration being such that the outer circumference of the first pivot pin is only in direct contact with an inner circumference of the bush along a certain part of its length near end portions of the bush.

7. A device according to claim 1 characterized in that the frame is built up of two parts, which are pivotable with respect to each other about a pivot perpendicularly crossing or intersecting said first pivot pin.

8. A device according to claim 1 characterized in that the cooperating jaws are provided with mating knives, one of said jaws being provided with a further knife near its free end, in such a manner that at the end of a jaws closing movement a knife of one of the jaws is guided between the knives of the other jaw.

9. A device according to claim 1, characterized in that the movable second jaw is provided with two knives having edges at an obtuse angle with each other, and wherein the fixed jaw is provided with one or more knives having rectilinear cutting edges.

10. A device according to claim 1, wherein one jaw is provided with at least one exchangeable crusher tooth, which is provided with two wings extending parallel to each other, between which a plate-shaped part of the one jaw is accommodated, said wings being retained between cams secured to a plate-shaped part of said one jaw.

11. A device according to claim 10, characterized in that a part of said crusher tooth contiguous to the wings is accommodated in a recess provided in the plate-shaped part, and wherein said cams provided on said crusher tooth abut against one side of the plate-shaped part on either side of said recess.

12. A device according to claim 1, characterized in that the two jaws are provided with crusher teeth at their facing edges, and wherein the jaws are furthermore provided with short, intermating knives near the first pivot pin.

13. A device according to claim 1, characterized in that the movable jaw is provided with a cutting knife and a projecting tip, and the fixed jaw is provided with serrated strips, wherein the knife may engage between the serrated strips when the jaws move towards each other.

14. A device according to claim 1, characterized in that the fixed jaw is provided with two spaced-apart jaw hubs for accommodating the second pivot pin by means of which the fixed jaw is secured to the frame, whereby the two jaw hubs closely surround the second pivot pin wherein the second pivot pin is furthermore passed through two frame hubs which form part of the frame and which are located at the sides of the jaw hubs forming part of the fixed jaw that face away from each other, and wherein a nut is screwed on a free end of the second pivot pin, by means of which the jaw and frame hubs can be pressed towards each other.

15. A device according to claim 14, characterized in that the two hubs forming part of the fixed jaw and accommodating the second pivot pin have different diameters and wherein the second pivot pin has a correspondingly stepped configuration.

16. A device according to claim 1, characterized in that a valve block is provided on one end of the setting cylinder, said valve block being provided with a valve which is adjustable in two positions, wherein in a first position of the valve a supply pipe, via which a fluid can be supplied to the setting cylinder in a space present at the side of a piston in the setting cylinder facing away from a piston rod, is in open communication with a bypass which is connected to the rod side of the cylinder, whilst in a second position the connection between a supply or a discharge pipe and the bypass is closed, and wherein a change-over from the first position to the second position is effected when a predetermined pressure in the supply or discharge pipe is exceeded.

17. A device according to claim 1, characterized in that said first jaw is provided with a first coupling juxtaposed to said first pivot pin, said first coupling cooperating with a second coupling secured to the frame, said couplings being hookable together in order to couple the jaws to the frame, said jaws being pivotable relative to the frame at the location of the couplings, about a fourth pin extending parallel to the first pivot pin.

18. A device according to claim 17, characterized in that said couplings comprise hook-shaped parts and a locking pin fitting into said hook-shaped parts.

19. A device according to claim 17 including adjusting means in spaced-apart relationship from the couplings for adjusting position of the jaws about the pivot pins relative to the frame.

20. A device according to claim 19, wherein said adjusting means comprises set bolts connected to the first jaw and the frame respectively, and wherein free ends of said set bolts abut against parts of the frame and the first jaw, respectively.

* * * * *